US007827484B2

(12) United States Patent
Déjean et al.

(10) Patent No.: US 7,827,484 B2
(45) Date of Patent: Nov. 2, 2010

(54) TEXT CORRECTION FOR PDF CONVERTERS

(75) Inventors: Hervé Déjean, Grenoble (FR); André Kempe, Grenoble (FR)

(73) Assignee: Xerox Corporation, Norwalk, CT (US)

(*) Notice: Subject to any disclaimer, the term of this patent is extended or adjusted under 35 U.S.C. 154(b) by 1432 days.

(21) Appl. No.: 11/219,496

(22) Filed: Sep. 2, 2005

(65) Prior Publication Data
US 2007/0055933 A1 Mar. 8, 2007

(51) Int. Cl.
G06F 17/00 (2006.01)
(52) U.S. Cl. ............................ 715/256; 715/245
(58) Field of Classification Search ............ 715/234, 715/245, 255, 256, 259, 260, 257, 273, 244
See application file for complete search history.

(56) References Cited

U.S. PATENT DOCUMENTS

| 5,572,423 | A | * | 11/1996 | Church | 715/257 |
| 5,715,469 | A | * | 2/1998 | Arning | 715/210 |
| 5,933,525 | A | * | 8/1999 | Makhoul et al. | 382/186 |
| 6,167,369 | A | * | 12/2000 | Schulze | 704/9 |
| 6,618,697 | B1 | | 9/2003 | Kantrowitz et al. | |
| 2003/0216913 | A1 | * | 11/2003 | Keely et al. | 704/235 |
| 2005/0007299 | A1 | * | 1/2005 | Gormish | 345/2.1 |
| 2005/0034068 | A1 | * | 2/2005 | Jaeger | 715/517 |
| 2007/0016862 | A1 | * | 1/2007 | Kuzmin | 715/700 |

OTHER PUBLICATIONS

Taghva, Kazem et. al; An expert system for automatically correcting OCR output; 1994; Information Science Research Institute.*
Kukich, Karen; Techniques for Automatically Correcting Words in Text; Dec. 1992; ACM Computing Surveys; vol. 24, No. 4.*
DCLab, "Converting from PDF to XML &MS Word: Avoiding the Pitfalls." at http://www.dclab.com/converting_from_pdf.asp, p. 1, Oct. 3, 2003 and p. 2, Nov. 3, 2003.*
Iceni Technology, "Gemini," 4 pages, at http://www.iceni.com/content/Gemini/, last visited Jun. 30, 2005.
Forney, "The Viterbi Algorithm," Proceedings of the IEEE, vol. 61, No. 3, Mar. 1973.
Nevill-Manning et al., "Extracting Text from Postscript," Software-Practice and Experience, vol. 28, No. 5, pp. 481-491, Apr. 1998.

(Continued)

*Primary Examiner*—Laurie Ries
(74) *Attorney, Agent, or Firm*—Fay Sharpe LLP

(57) ABSTRACT

To correct at least one extraneous or missing space in a document, weights are assigned to tokens contained in a dictionary. Each token is defined by an ordered sequence of non-space symbols. The weights are assigned based on at least one of a token length and frequency of occurrence of the token in the document. Corrected text is generated from text of the document by applying an ordered sequence of symbol-level transformations selected from a group of symbol-level transformations including at least (i) deleting a space, (ii) inserting a space, and (iii) copying a symbol. The ordered sequence of symbol-level transformations is optimized respective to an objective function dependent upon the weights of tokens of the corrected text.

25 Claims, 1 Drawing Sheet

OTHER PUBLICATIONS

ScanSoft, OmniPage, at http://www.scansoft.com/omnipage/capturesdk/, 2 pages, last visited Jul. 14, 2005.

Cambridgedocs XML Conversion and Publishing Technologies, at http://www.cambridgedoc.com/, last visited Jul. 14, 2005.

Kempe et al., "WFSC—A New Weighted Finite State Compiler," Lecture Notes in Computer Science, vol. 2759/2003, pp. 108-119, Aug. 2003.

* cited by examiner

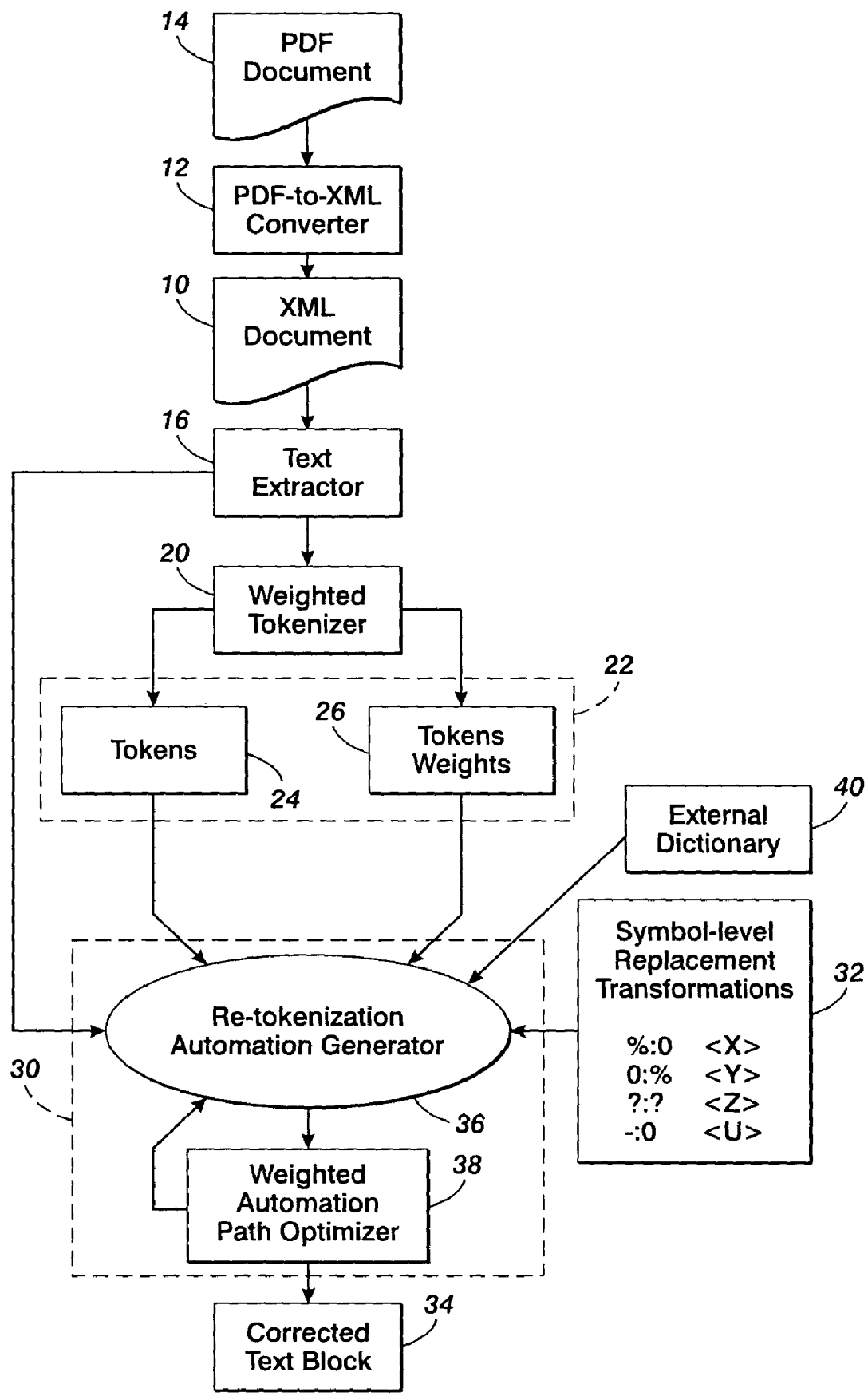

TEXT CORRECTION FOR PDF CONVERTERS

BACKGROUND

The following relates to the information processing arts. It particularly relates to correction of errors introduced into text-based documents created by conversion from a non-text format, and is described with particular reference thereto. However, the following relates more generally to correction of errors in text-based documents generated directly as text or generated through the use of conversion processing.

Document conversion to text or text-based formats is useful to promote document re-use, enable content searching, facilitate document structuring, and so forth. For example, converting documents to structured extensible mark-up language (XML), hypertext mark-up language (HTML), standard generalized markup language (SGML), or another structured format including mark-up tags facilitates an integrated document database environment employing a common document structure.

Converting a document originally formatted as a portable document format (PDF) file or other non-text format to a text format such as an ASCII file, a rich text format (RTF), an HTML document, an XML document, an SGML document, or so forth, can introduce errors. The most common errors in converting PDF to text include introducing extraneous spaces (thus "breaking up" what should be a single word), improperly removing spaces (and thus "running words together"), and inserting or retaining extraneous hyphens. Such errors can occur, for example, due to the PDF file having multiple font sizes, font styles, and/or font types, due to hyphenation of words at the end of lines of text in a page layout format, and so forth. Errors due to font size, style, type, or special font effects may occur more frequently in converted section headings, titles, and other "non-standard" text that tend to use enlarged fonts, boldface, underscores, and so forth. Errors in section headings or other document structure annotations can degrade performance of automated table-of-contents extractors or other automated document structuring operations that may be applied after the conversion to text.

When converting PDF or other formats to a structured format such as XML, another type of error which can occur is improper text flow or improper text blocking. For example, in XML mark-up tag pairs such as <PARAGRAPH></PARAGRAPH>, <TEXT></TEXT>, or so forth are typically used to delineate paragraphs or other blocks of text. On the other hand, PDF and some other page layout-based formats delineate text into physical lines on a page. When converting from PDF or another page layout-oriented format to XML, each physical line of text may be delineated by a suitable XML mark-up tag pair such as <TEXT></TEXT>, even though the physical lines on the page do not correspond to logical groupings or blocks of text.

BRIEF DESCRIPTION

According to certain aspects illustrated herein, there is provided a method for correcting at least one extraneous or missing space in a document. Text is extracted from the document. Corrected text candidates are constructed from the extracted text by selectively applying to the extracted text one or more corrections selected from a set of corrections including at least (i) deleting an extraneous space and (ii) inserting a missing space. Correction weights are computed corresponding to the corrected text candidates based at least on token weights of tokens in the candidate corrected text. A corrected text is selected from the corrected text candidates based on the correction weights of the corrected text candidates.

According to certain aspects illustrated herein, there is provided an apparatus for correcting at least one extraneous or missing space in a document. The apparatus includes a dictionary of weighted tokens, and a text corrector that generates corrected text from text of the document by applying one or more corrections selected from a set of corrections including at least (i) deleting an extraneous space and (ii) inserting a missing space. The applying is optimized respective to the dictionary weightings of the tokens of the corrected text.

According to certain aspects illustrated herein, there is provided a method for correcting at least one extraneous or missing space in a document. Weights are assigned to tokens contained in a dictionary. Each token is defined by an ordered sequence of non-space symbols. The weights are assigned based on at least one of a token length and frequency of occurrence of the token in the document. Corrected text is generated from text of the document by applying an ordered sequence of symbol-level transformations selected from a group of symbol-level transformations including at least (i) deleting a space, (ii) inserting a space, and (iii) copying a symbol. The ordered sequence of symbol-level transformations is optimized respective to an objective function dependent upon the weights of tokens of the corrected text.

BRIEF DESCRIPTION OF THE DRAWING

The FIGURE diagrammatically shows a text conversion and correction system for converting a PDF document to XML with correction for missing spaces and for extraneous spaces or hyphens.

DETAILED DESCRIPTION

With reference to the FIGURE, a text-based document 10 is to be corrected for errors such as extraneous spaces, extraneous hyphens, or missing spaces. The document 10 may have been generated, for example, by a PDF-to-XML converter 12 that converts a PDF document 14 into XML. In this case, the document 10 may also have text flow problems, for example when concatenating text from contiguous tags. For example deleting <TEXT> tags in order to build a paragraph can introduce text flow problems. While the illustrated document 10 is an XML document, other text-based formats such as RTF, HTML, ASCII, and so forth can also be corrected using the methods and apparatuses disclosed herein.

A text extractor 16 extracts a portion of text from the text-based document 10 for processing. The portion of text can be a selected portion of the text of the document, for example a portion delineated by text block-delineating mark-up tag pairs, or can be the entire text of the document 10. In the case of the illustrated XML document 10, the text extractor 16 optionally removes any mark-up tags from the extracted text.

A weighted tokenizer 20 processes the document 10 to generate a weighted dictionary 22 including tokens 24 each having an assigned token weight 26. For example, each token can be defined by an ordered sequence of non-space symbols occurring in the document 10. Typically, each token corresponds to a word made up of one or more letters; however, a token can also correspond to a numeric value, a hexadecimal value, an acronym, an alphanumeric string, or so forth. In some embodiments, tokens are limited to ordered sequences of letters, so that each token corresponds to a word, acronym or other sequence of letters. Typically, the weighted tokenizer 20 processes the entire text of the document 10 as extracted by the text extractor 16, with mark-up tags or other identifiable document mark-up removed. For example, in XML nodes and their attributes are removed, and only text nodes are extracted. Optionally, the dictionary 22 can be generated from a selected portion of the text of the document 10, rather than from the entire text of the document 10.

The weighted tokenizer 20 also assigns token weights 26 corresponding to the tokens 24. Each token weight is indicative of a likelihood that the corresponding token appearing in a text or text portion is "correct". For example, a long token (that is, a token made up of an ordered sequence of many symbols) appearing in text is less likely to occur by error than a shorter token. Similarly, a token which occurs frequently in the document 10 is more likely to be correct than a token which occurs once or only a few times. In some embodiments, the token weight is proportional to:

$$\text{length(token)} \times \log(\text{frequency(token)} + 1) \quad (1),$$

where "token" denotes a token, "length(token)" denotes the length of the token, "frequency(token)" denotes a frequency of occurrence of the token in the document, and "log( )" denotes a common, natural, or other logarithmic function. A token weighting in accordance with Expression (1) advantageously assigns relatively greater weight to long tokens and to tokens that occur frequently in the document 10.

A text corrector 30 receives text from the document 10 extracted by the text extractor 16 and applies symbol-level transformations 32 to the text to produce a corrected text 34 in which errors such as extraneous spaces, missing spaces, and extraneous hyphens are substantially removed. To enable correction of extraneous and missing spaces, the symbol-level transformations 32 should include at least a space insertion symbol-level transformation that inserts a space into the text, and a space deletion symbol-level transformation that deletes a space from the text. Additional corrective symbol-level transformations 32 can also be included, such as a hyphen deletion symbol-level transformation that deletes a hyphen from the text, a hyphen insertion symbol-level transformation that inserts a hyphen into the text, and so forth.

In the illustrated approach, the text corrector 30 includes a re-tokenization automaton generator 36 that generates a re-tokenization automaton that applies an ordered sequence of symbol-level transformations to the text. The symbol-level transformations of the ordered sequence are selected from the group of symbol-level transformations 32. In embodiments employing an automaton or transducer, the symbol-level transformations 32 suitably include a symbol copying transformation that copies or maps a symbol of the text without modification. A weighted automaton path optimizer 38 optimizes the ordered sequence of symbol-level transformations defining the re-tokenization automaton to optimize an objective function that is functionally dependent at least upon the weights of tokens of the corrected text output by the automaton. For example, in some optimization approaches, each ordered sequence of symbol-level transformations when applied to the extracted text defines a corrected text candidate. The corrected text candidate is associated with a corresponding correction weight computed using the objective function, and the optimizer 38 selects a corrected text from the corrected text candidates based on the correction weights.

In one example embodiment of the illustrated approach, the group of symbol-level transformations 32 is the set:

$$T_S = \{\%:0, 0:\%, ?:?\} \quad (2),$$

where $T_S$ denotes the group or set of symbol-level transformations, "%" denotes a space, "0" denotes the absence of any symbol, "?" denotes any symbol, "%:0" denotes the symbol-level transformation of removing a space, "0:%" denotes the symbol-level transformation of inserting a space, and "?:?" denotes the symbol-level transformation of copying or mapping a symbol without change. Other symbol-level transformations can also be included. For example, if it is also desired to be able to remove extraneous hyphens, the set of transformations of Expression (2) can be selected as:

$$T_S = \{\%:0, 0:\%, -:0, ?:?\} \quad (3),$$

where "–:0" denotes the added symbol-level transformation for removing a hyphen.

The re-tokenization is suitably represented as:

$$\text{Corrected text candidate} = S \text{ .o. } T_S^* \text{.o.} D^* \quad (4),$$

where "S" represents the extracted text to be corrected, "$T_S^*$" represents the re-tokenization automaton, "D" represents the dictionary 22, the symbol ".o." represents the transducer composition operation, and the symbol "*" represents the Kleene star indicating that the string S is composed of a sequence (eventually empty) of dictionary entries. The correction weight for each corrected text candidate is suitably computed, for example, as a product or sum of the token weight of each letter.

In some embodiments, each symbol-level transformation is also assigned a weight that is incorporated into the objective function used to evaluate the corrected text candidates. For example, the objective function can be a sum or product over the corrected text of a product of the token weight times the symbol-level transformation weight. The symbol-level transformation weights can be set manually, based for example on trial and error, or tuned automatically using a training set composed of text pairs $<s_1, s_2>$, in which $s_1$ is a correct text and $s_2$ is a corresponding text with errors. For example, the erroneous text $S_2$ can be generated by corrupting the $s_1$ text randomly or based on a corruption algorithm that mimics errors in the conversion process. The training optimizes the symbol-level transformation weights to maximize the number of corrupted $s_2$ text samples that are successfully corrected to the corresponding $s_1$ text sample using the text corrector 30.

In test runs, the effectiveness of the text corrector 30 has been found to depend upon the relative weights of the symbol-level transformations. In some embodiments, the space deletion transformation ("%:0") is assigned a substantially higher weight than the other symbol-level transformations, so as to bias the optimization toward removing spaces. This biasing has been found to be advantageous for certain converted PDF documents in which the PDF conversion process tends to insert extraneous spaces more frequently than introducing other errors such as inserting extraneous hyphens or erroneously omitting spaces. Weightings of: 5 for the "%:0" space deletion transformation; 0.5 for the "0:%" space insertion transformation; and 0.5 for the "?:?" symbol copying transformation have been found to work well for correcting converted PDF documents. For the set of symbol-level transformations of Expression=(4) which also includes the "–:0" hyphen deletion transformation, assigning the "–:0" hyphen deletion transformation a weight of 0.5 as well has been found to work well for correcting converted PDF documents.

Various optimization techniques can be used to optimize the re-tokenization of Expression (4). In some embodiments, a Viterbi optimization algorithm is used to optimize the path of the re-tokenization automaton respective to correction weights of corrected text candidates defined by the path. The Viterbi algorithm is described, for example, in Fortney Jr., "The Viterbi Algorithm" Proc. Of the IEEE vol. 61, no. 3, pp. 268-78 (1973). The Viterbi optimization finds the best path in linear time, which is advantageous since the number of possible paths is typically large. In some embodiments, the optimization may identify an optimized path which is not the global optimum path. For example, the optimization may terminate when the path has a correction weight passing a selected optimization termination threshold.

The text to be corrected is extracted from the document 10 by the text extractor 16. If the document 10 is a structured document with mark-up, such as an HTML document, an XML document, an SGML document, or so forth, then the text extractor 16 optionally removes any mark-up tags from the text. When a mark-up tag is removed, tokens before and after the removed tag may be erroneously concatenated (that is, a space is missing), or may include an extraneous hyphen, or so forth. For example, consider the following portion of a document that has been converted from a page layout format to an XML format:

```
<PARAGRAPH>
    <TEXT>Safe ty standards to be observed</TEXT>
    <TEXT>during repair or maintenance oper-</TEXT>
    <TEXT>ations on vehicles equipped with</TEXT>
    <TEXT>air-bag systems provided by the supplier</TEXT>
</PARAGRAPH>
```

This text includes one error ("Safe ty", includes an extraneous space) introduced during the conversion from page layout format to text format with XML mark-up. Additionally, the conversion to XML retained the physical layout of four lines of text by delineating each line by a <TEXT> and </TEXT> tag pair. In other words, each physical line of text in the source page layout document is converted as a leaf of the XML document. These <TEXT></TEXT> delineations are undesirable since the lines of the page layout format do not correspond to logical groupings or blocks of text. Accordingly, the text extractor 16 extracts the text portion between the <PARAGRAPH> and </PARAGRAPH> mark-up tags, since this text corresponds to a paragraph which is a logical grouping of text. During extraction, the <TEXT> and </TEXT> tags are omitted. The output of the text extractor 16 is therefore:

Safe ty standards to be observedduring repair or maintenance oper-ations on vehicles equipped withair-bag systems provided by the supplier where the text is now treated as a single continuous string of symbols. The removal of the <TEXT> and </TEXT> mark-up tags from the extracted text introduces the following additional errors: "observedduring" (missing space); "oper-ations" (extraneous hyphen); and "withair-bag" (missing space). The text corrector 30 corrects both the error introduced during conversion to XML and the errors introduced by the tag removal. The correction of errors introduced by the removal of mark-up tags effectuates reflow of text across the removed mark-up tags. The output of the text corrector 30 is therefore:

Safety standards to be observed during repair or maintenance operations on vehicles equipped with air-bag systems provided by the supplier This final text has the corrected the error introduced by conversion to XML and has been reflowed so that the text corresponds to the logical paragraph block of text.

In the illustrated embodiment, the dictionary 22 is derived from the document 10 by the weighted tokenizer 20. It is also contemplated to employ an external dictionary for use by the text corrector 30. The external dictionary can have weights pre-assigned based on frequency of occurrence in the language or based on other criteria, or can have weights assigned based on characteristics specific to the document 10, such as frequency of occurrence in the document 10. In other contemplated embodiments, a dictionary is derived, and the derived dictionary is supplemented by an external dictionary 40.

An advantage of extracting the dictionary from the document 10, optionally supplemented by the external dictionary 40, is that the resulting dictionary is specific to the document 10. When correcting technical documents or other documents pertaining to specialized subject matter, an external dictionary may not comprehensively cover the words or other tokens used in the document.

The PDF-to-XML conversion with text correction shown in the FIGURE was employed to correct a technical document pertaining to machinery. Table I shows original text portions and corresponding corrections. The text is properly corrected in each case, except that: (i) "E N G I N E E R I N G" was not corrected; "Ch ec kin g b en d in g" was incompletely corrected; and "Oil vap ou r f u ll r e cir c u lat ion s ys t em (B low -b y)" was incompletely corrected". The term "ENGINEERING" occurred only once in the document, and may have been properly corrected if the extracted dictionary had been supplemented by an external dictionary. In addition to substantially correcting the erroneous text portions listed in Table I, the text correction processing did not introduce any errors in text that was already correct.

TABLE I

Corrections in Test Document

| Original text | Corrected text |
|---|---|
| TI GH TEN I N G TO RQ UES | TIGHTENING TORQUES |
| Throttle p edal position sensor | Throttle pedal position sensor |
| Fit t in g r ear s eal | Fitting rear seal |
| Oil vap ou r f u ll r e cir c u lat ion s ys t em ( B low -b y) | Oil vapour full recirculation system ( Blow-b y) |
| En gine coolant temperatu re sensor | Engine coolant temperature sensor |
| Clutch p edal position sensor | Clutch pedal position sensor |
| Brake pedal p osition senso r | Brake pedal position sensor |
| Ch ec kin gt o r s ion | Checking torsion |
| I V E C O | IVECO |
| E N G I N E E R I N G | E N G I N E E R I N G |
| I N J E C T I O N R O T A R Y P U M P T E S T V A L U E S | INJECTION ROTARY PUMP TEST VALUES |
| Ch ec kin g b en d in g | Checking bend ing |
| Ch ec kin g t o r s i on | Checking torsion |
| Ru n u p | Run up |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for correcting at least one extraneous or missing space in a document, the method comprising:
   extracting text from the document;
   constructing corrected text candidates from the extracted text by selectively applying to the extracted text one or more corrections selected from a set of corrections including at least (i) deleting an extraneous space and (ii) inserting a missing space;

computing correction weights corresponding to the corrected text candidates based at least on token weights of tokens in the candidate corrected text; and selecting a corrected text from the corrected text candidates based on the correction weights of the corrected text candidates.

2. The method as set forth in claim 1, further comprising:
deriving a dictionary of tokens from the document; and
assigning token weights to the tokens of the dictionary;
the assigned token weights being used in the computing of correction weights corresponding to corrected text.

3. The method as set forth in claim 2, wherein the assigning of token weights to the tokens of the dictionary comprises:
assigning a weight to each token based on its length and based on its frequency of occurrence in the document.

4. The method as set forth in claim 2, wherein the assigning of token weights to the tokens of the dictionary comprises:
assigning a weight to each token proportional to:

length(token)×log(frequency(token)+1)

where length(token) denotes a length of the token, frequency (token) denotes a frequency of occurrence of the token in the document, and log( ) denotes a common, natural, or other logarithmic function.

5. The method as set forth in claim 1, wherein the set of corrections further includes (iii) deleting a hyphen.

6. The method as set forth in claim 1, wherein the set of corrections further includes at least (iii) not modifying a symbol and wherein each correction in the set of corrections has an assigned weight, the computing of a correction weight comprising:
computing the correction weight based on a combination of (i) the token weights of the tokens in the corrected text candidate, and (ii) assigned weights of the selectively applied one or more corrections.

7. The method as set forth in claim 6, wherein the deleting an extraneous space correction has a substantially higher assigned weight than the inserting a missing space correction.

8. The method as set forth in claim 1, wherein the set of corrections further includes at least (iii) not modifying a symbol and wherein the selecting of the corrected text comprises:
constructing a re-tokenization automaton having a path defined by a selected ordered sequence of corrections selected from the set of corrections; and
optimizing the path of the re-tokenization automaton respective to correction weights of corrected text candidates defined by the path.

9. The method as set forth in claim 8, wherein the optimizing of the path comprises:
optimizing the path using a Viterbi algorithm.

10. The method as set forth in claim 1, further comprising:
generating the document by converting a PDF document.

11. The method as set forth in claim 1, wherein the document has mark-up tags, and the extracting of text from the document comprises:
omitting one or more mark-up tags from the extracted text, wherein the constructing of corrected text candidates selectively applies one or more corrections selected from the set of corrections at locations of omitted mark-up tags.

12. A system for correcting at least one extraneous or missing space in a document, the system comprising:
a dictionary of weighted tokens; and
an apparatus including a text corrector that generates corrected text from text of the document by applying one or more corrections selected from a set of corrections including at least (i) deleting an extraneous space and (ii) inserting a missing space, the applying being optimized respective to the dictionary weightings of the tokens of the corrected text.

13. The system as set forth in claim 12, wherein:
the apparatus further comprises a dictionary compiler that derives the dictionary of weighted tokens from the document.

14. The system as set forth in claim 12, wherein the applying is optimized respective to the dictionary weightings of the tokens of the corrected text and weightings of the applied corrections.

15. The system as set forth in claim 12, wherein the applying is optimized using a Viterbi optimization algorithm.

16. A system for correcting at least one extraneous or missing space in a document, the system comprising:
a dictionary of weighted tokens; and
an apparatus including:
a text corrector that generates corrected text from text of the document by applying one or more corrections selected from a set of corrections including at least (i) deleting an extraneous space and (ii) inserting a missing space, the applying being optimized respective to the dictionary weightings of the tokens of the corrected text, and
a PDF-to-XML converter that generates the document including XML tags from a PDF document, the text corrector generating corrected text corresponding to a portion of the document delineated by selected XML tags.

17. A method for correcting at least one extraneous or missing space in a document, the method comprising:
assigning weights to tokens contained in a dictionary, each token being defined by an ordered sequence of non-space symbols, the weights being assigned based on at least one of a token length and frequency of occurrence of the token in the document; and
generating corrected text from text comprising a sequence of tokens of the document by applying an ordered sequence of symbol-level transformations to the text comprising the sequence of tokens wherein the symbol-level transformations of the ordered sequence of symbol-level transformations selected from a group of symbol-level transformations including at least (i) deleting a space, (ii) inserting a space, and (iii) copying a symbol, the ordered sequence of symbol-level transformations being optimized respective to an objective function dependent upon the weights of tokens of the corrected text.

18. The method as set forth in claim 17, further comprising:
deriving the dictionary of tokens from the document.

19. The method as set forth in claim 17, wherein the assigning comprises:
assigning a weight to each token of the dictionary based on a product of the token length and the frequency of occurrence of the token in the document.

20. The method as set forth in claim 17, further comprising:
assigning a weight to each symbol-level transformation of the group of symbol-level transformations, the objective function being further dependent upon the weights of the symbol-level transformations of the ordered sequence of symbol-level transformations.

21. The method as set forth in claim 20, wherein the space deletion symbol-level transformation is assigned a substantially higher weight than the other symbol-level transformations of the group of symbol-level transformations.

22. The method as set forth in claim 17, wherein the group of symbol-level transformations further includes a deleting a hyphen symbol-level transformation.

23. The method as set forth in claim 17, wherein the optimizing comprises:
   constructing a plurality of corrected text candidates by applying different ordered sequences of symbol-level transformations to the text comprising the sequence of tokens; and
   selecting the corrected text from the corrected text candidates based on the value of the objective function for each corrected text candidate.

24. The method as set forth in claim 17, wherein the ordered sequence of symbol-level transformations is optimized using a Viterbi optimization algorithm.

25. The method as set forth in claim 17, wherein the document includes mark-up tags, and the generating of corrected text further comprises:
   removing mark-up tags from the text comprising the sequence of tokens, the ordered sequence of symbol-level transformations being applied after the removing and effectuating reflow of text across the removed mark-up tags.

* * * * *